United States Patent [19]

Cherniak

[11] 3,749,346
[45] July 31, 1973

[54] SADDLE CLIP FOR HANGING LIGHT FIXTURES
[76] Inventor: Victor B. Cherniak, 1057 Madison Ave., Chula Vista, Calif. 92011
[22] Filed: Oct. 14, 1971
[21] Appl. No.: 189,307

[52] U.S. Cl. .................................. 248/302, 248/343
[51] Int. Cl. .............................................. F16b 1/00
[58] Field of Search ................... 248/302, 317, 318, 248/342, 343, 228, 58; 211/119; 52/484, 39

[56] References Cited
UNITED STATES PATENTS
| 491,062 | 1/1893 | Granger | 248/58 UX |
| 3,590,546 | 7/1971 | Lambert | 52/484 X |
| 2,503,859 | 4/1950 | Webber | 248/302 |
| 3,589,660 | 6/1971 | Dunckel | 52/39 X |

FOREIGN PATENTS OR APPLICATIONS
| 472,988 | 3/1929 | Germany | 248/318 |

Primary Examiner—J. Franklin Foss
Attorney—Carl R. Brown et al.

[57] ABSTRACT

A saddle clip for hanging the channel box type of fixture used for fluorescent lights, formed from a single piece of wire and adapted for installation without tools. The clip has resilient legs which hook under and grip the edges of a fixture and tend to tighten their grip under load. The upper portion of the clip is adaptable to standard support members for hanging the fixture.

4 Claims, 4 Drawing Figures

PATENTED JUL 31 1973          3,749,346
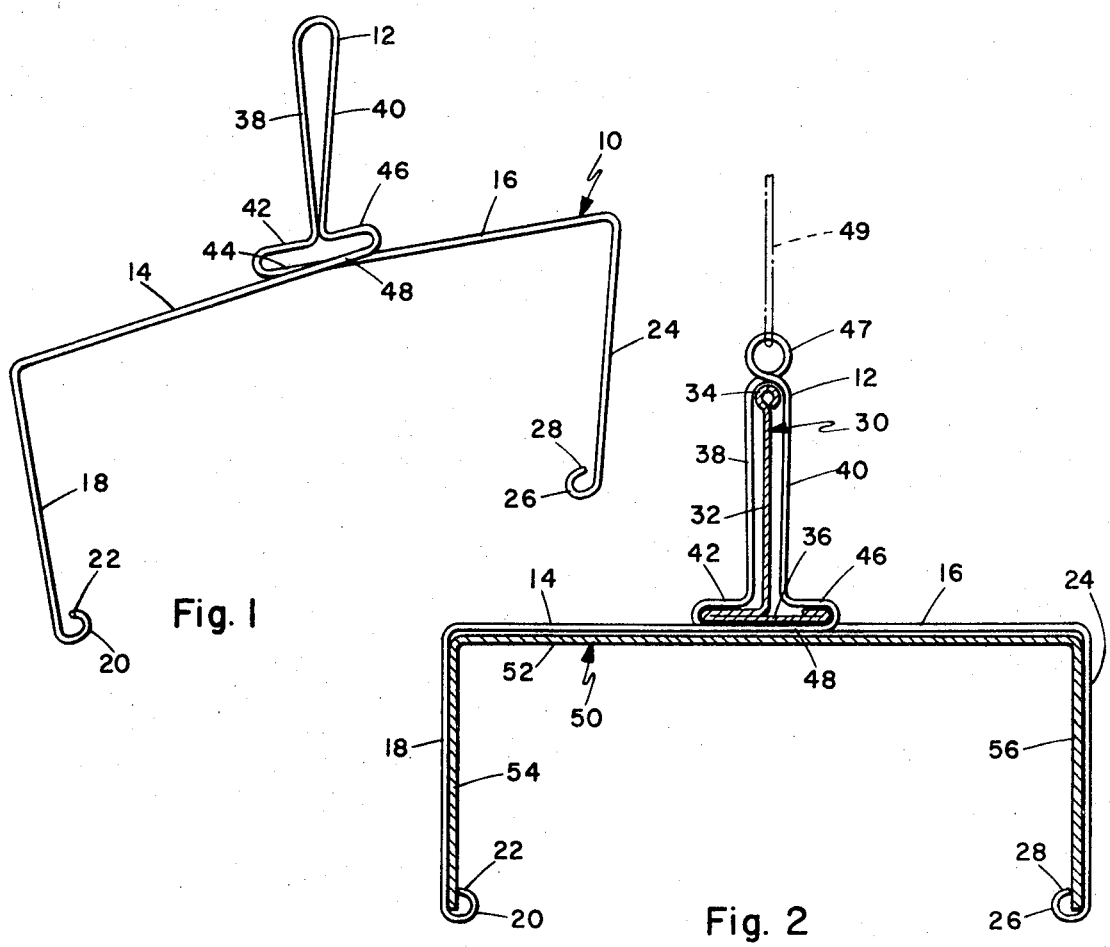
Fig. 1
Fig. 2
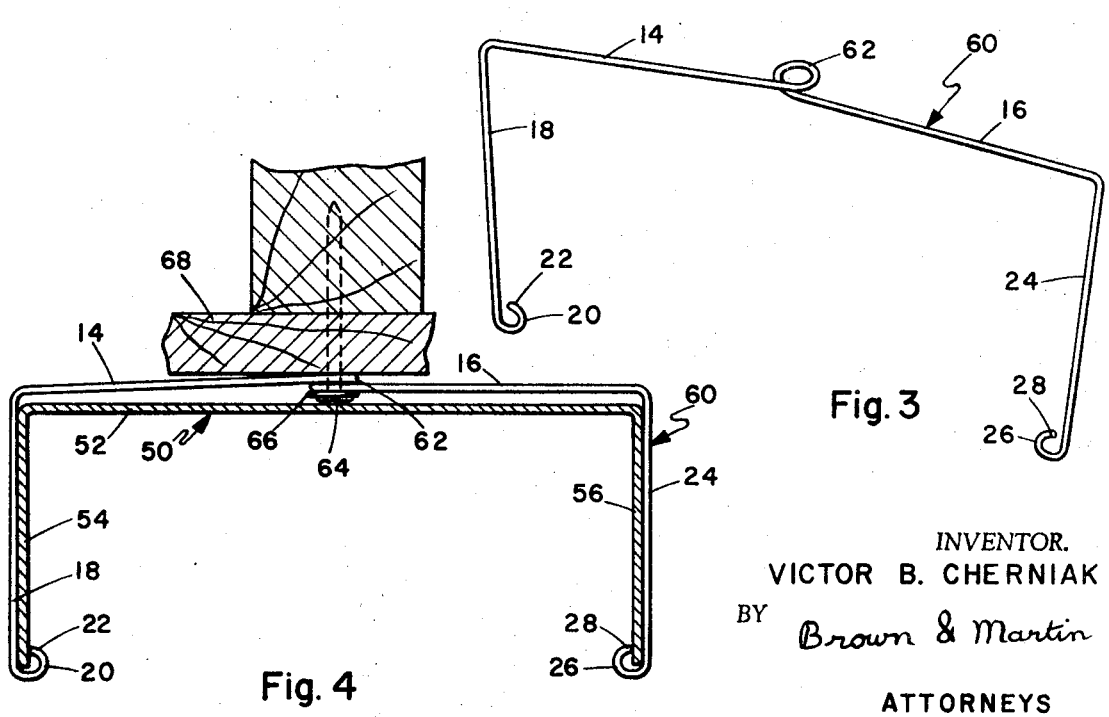
Fig. 3
Fig. 4
INVENTOR.
VICTOR B. CHERNIAK
BY Brown & Martin
ATTORNEYS

SADDLE CLIP FOR HANGING LIGHT FIXTURES

BACKGROUND OF THE INVENTION

Many different types of hangers have been devised for hanging fluorescent light fixtures from ceilings and various configurations of support members. Most types require tools, for their installation, making the job awkward while standing on a ladder or scaffold and holding a fixture in place. It has also been found that many of the hangers in use tend to become loose or give way under unusual loads, such as during an earthquake, causing fixtures to fall although structure damage is minimal.

SUMMARY OF THE INVENTION

The saddle clip described herein is formed from a single piece of wire and is snapped on a light fixture without tools, yet tends to tighten under load and retains ample strength to hold the fixture. One form of the clip is adaptable to the conventional T-bar type of support member from which fluorescent light fixtures are suspended, and has resilient portions which grip the T-bar securely. Another form is suitable for attachment by a screw or nail to overhead structure. In either form the clip will allow for vibration and limited motion of the fixture without any loss of grip.

The primary object of this invention, therefore is to provide a new and improved saddle clip for hanging light fixtures.

Another object of this invention is to provide a saddle clip which grips the fixture securely under load.

A further object of the invention is to provide a new and improved saddle clip which is adaptable to various support members and structures.

Other objects and many advantages of this invention will become more apparent upon a reading of the following detailed description together with an examination of the drawings, wherein like reference numerals refer to like parts throughout and in which:

FIG. 1 is a perspective view of the basic clip.

FIG. 2 is a view of a typical light fixture and support member in section, showing installation of the clip in a slightly modified form.

FIG. 3 is a perspective view of an alternative form of the clip.

FIG. 4 is a sectional view showing the alternative clip securing a fixture to a ceiling.

DESCRIPTION OF THE PREFERRED EMBODIMENTS

Referring to FIGS. 1 and 2, the saddle clip 10 comprises a hanger loop 12 from which a pair of arms 14 and 16 extend, outward in opposite directions. At the outer end of arm 14 is a downwardly extending leg 18, with an upwardly and inwardly rolled hook 20, the end 22 of the hook being outwardly turned toward the leg. At the outer end of arm 16 is a similar leg 24, with an upwardly and inwardly rolled hook 26 at its lower end, the end 28 of the hook being outwardly turned toward the leg.

The hanger loop 12 is formed to fit over a conventional T-bar member 30, having a vertical web 32 with a rolled upper rib 34 and a folded T flange 36 at the base. As shown, the hanger loop has downwardly extending legs 38 and 40 which straddle the rib 34 and web 32. At the lower end of leg 38 is an outwardly extending return folded clamp loop 42, the returned portion 44 of which continues into arm 16. The lower end of leg 40 has an outwardly extending return folded clamp loop 46, the returned portion 48 of which continues into arm 14. The modified form shown in FIG. 2 has an additional eye 47 formed at the top of hanger loop 12, which allows the assembly to be hung from any suitable suspension means 49 through the eye.

The clip straddles the frame of a fluorescent light fixture which comprises an inverted U-shaped box channel 50, having a flat top plate 52 and side walls 54 and 56. Legs 18 and 24 extend downwardly outside walls 54 and 56 and hooks 20 and 26 snap under the lower edges of the respective walls. The clearance between the outwardly turned end of each hook and its respective leg is just sufficient for the wall to be held with a light frictional grip in the hook.

In the formed and relaxed state of the saddle clip, as in FIG. 1, the legs of the hanger loop 12 are biased together. To mount the saddle clip on T-bar 30, the upper ends of legs 18 and 24 are pushed inwardly, which separates clamp loops 42 and 46 and opens the hanger loop to slide over the T-bar. This can be done with one hand and any suitable number of clips can be installed on the T-bar, preparatory to hanging the fixture. When the clip is released the clamp loops resiliently grip flange 36 and hold the clip in place. The box channel 50 is then hung by engaging the lower edge of one side wall in the hooks at one side of the mounted clips, and swinging the box channel up to snap the lower edge of the other wall into the hooks on the other side. The resilience of the saddle clip and a slight clearance between top plate 52 and arms 14 and 16 allow this to be accomplished with a minimum of force.

Once in place, the fixture has some freedom to vibrate or shift slightly, due to the resilience of the mounting. However, any unusual load in any direction will tend to tighten the clamping action of the clip, since the arms 14 and 16 cross under the T-bar and cause the clamp loops to bind in opposition to the load. A direct downward load pulls the clamp loops together on the T-bar and seats the fixture down into the hooks of the clip. It has been found that saddle clips made from resilient steel wire, such as music wire, on the order of 20 or 26 gage, have ample strength to hold conventional light fixtures.

In instances where T-bar members cannot be used or the light fixtures must be mounted directly on a ceiling or other overhead structure, the modified form of the clip shown in FIGS. 3 and 4 may be used. Except for the hanger loop, the structure is similar to that of clip 10 and the corresponding arm, leg and hook elements are similarly numbered for simplicity.

In the modified saddle clip 60, the arms 14 and 16 join in a simple circular hanger loop 62, whose general plane is perpendicular to legs 18 and 24. In FIG. 4, the clip is shown mounted by means of a nail 64 passed through a washer 66 under hanger loop 62 and driven upwardly into ceiling structure 68. For heavy loads, or in areas subject to earthquake, a gripping type nail or a screw could be used. Any unusual load, particularly in a downward direction, will cause the legs 18 and 24 to tighten against the fixture, and hanger loop 62 will be tightened around the nail or other fastener due to the crossing of the arms at the center.

Having described my invention, I now claim.

1. A wire saddle clip for hanging light fixtures, comprising:

a hanger loop for attachment to a supporting member;

a pair of arms crossing over and extending outwardly from said hanger loop on opposite sides thereof;

said hanger loop having outwardly opposed clamp loops for gripping a support member therebetween, each of said clamp loops having a return folded portion joining the arm extending on the opposite side of the hanger loop;

legs extending downwardly from the outer ends of said arms;

and the lower ends of said legs having inwardly rolled hooks for engagement with lower edge portions of a fixture held between said legs.

2. A saddle clip according to claim 1, wherein said hanger loop has spaced legs extending from said clamp loops in a direction opposite to said first mentioned legs.

3. A saddle clip according to claim 2, wherein said hanger loop legs are resiliently biased together at the ends adjacent said clamp loops.

4. A saddle clip according to claim 2, wherein said hanger loop has a substantially circular eye at the upper ends of said legs.

* * * * *